(12) United States Patent
Sekimoto et al.

(10) Patent No.: US 8,174,609 B2
(45) Date of Patent: *May 8, 2012

(54) CAMERA MODULE AND ELECTRONIC DEVICE INCLUDING THE SAME

(75) Inventors: Yoshihiro Sekimoto, Osaka (JP); Kazuya Fujita, Osaka (JP); Kiyoharu Shimano, Osaka (JP); Kenji Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 430 days.

This patent is subject to a terminal disclaimer.

(21) Appl. No.: 12/454,813

(22) Filed: May 22, 2009

(65) Prior Publication Data

US 2009/0295983 A1    Dec. 3, 2009

(30) Foreign Application Priority Data

May 27, 2008  (JP) ................................. 2008-138261

(51) Int. Cl.
*H04N 5/235* (2006.01)
*H04N 5/225* (2006.01)
*G03B 7/00* (2006.01)

(52) U.S. Cl. ........................................ 348/362; 359/340
(58) Field of Classification Search .................. 348/335, 348/340, 362, 363
See application file for complete search history.

(56) References Cited

U.S. PATENT DOCUMENTS

| 7,114,862 B2 * | 10/2006 | Huang ............................ 396/452 |
| 7,605,864 B2 | 10/2009 | Takahashi et al. |
| 7,613,389 B2 | 11/2009 | Suzuki et al. |
| 7,627,238 B2 | 12/2009 | Osaka et al. |
| 7,699,542 B2 | 4/2010 | Watanabe et al. |
| 7,869,149 B2 | 1/2011 | Ke |
| 7,871,210 B2 | 1/2011 | Masuzawa et al. |
| 2005/0179803 A1 | 8/2005 | Sawai |
| 2007/0077061 A1 | 4/2007 | Watanabe et al. |
| 2007/0086770 A1 | 4/2007 | Okita et al. |
| 2009/0141161 A1 | 6/2009 | Kawamoto |
| 2010/0053412 A1* | 3/2010 | Sekimoto et al. .............. 348/335 |
| 2010/0157137 A1* | 6/2010 | Imai et al. ...................... 348/362 |

FOREIGN PATENT DOCUMENTS

| EP | 1630580 A1 | 3/2006 |
| JP | 2006-050693 A | 2/2006 |
| JP | 2006-242994 A | 9/2006 |
| JP | 2007-108596 A | 4/2007 |
| JP | 2007-310242 A | 11/2007 |
| JP | 2007-316477 A | 12/2007 |
| JP | 2008-015159 A | 1/2008 |
| JP | 2008-111876 A | 5/2008 |
| JP | 2008134300 A | 6/2008 |
| WO | WO-2004-107007 A1 | 12/2004 |

OTHER PUBLICATIONS

U.S. Appl. No. 12/461,908, filed Aug. 27, 2009, Sekimoto et al.

* cited by examiner

*Primary Examiner* — David N Spector
(74) *Attorney, Agent, or Firm* — Edwards Wildman Palmer LLP; David G. Conlin; David A. Tucker (57) ABSTRACT

In a camera module 1 of the present invention, a mechanical shutter 2 is provided above a top surface of a lens unit 3, and a protrusion section formed to an end of a lens 31 is held in a depression section formed on a back surface of the mechanical shutter 2. With the arrangement, it is possible to cause the camera module 1 employing the mechanical shutter 2 to be smaller and thinner at the same time.

14 Claims, 9 Drawing Sheets

PRIOR ART

PRIOR ART

CAMERA MODULE AND ELECTRONIC DEVICE INCLUDING THE SAME

This Nonprovisional application claims priority under 35 U.S.C. §119(a) on Patent Application No. 2008-138261 filed in Japan on May 27, 2008, the entire contents of which are hereby incorporated by reference.

TECHNICAL FIELD

The present invention relates to a camera module which is to be included in an electronic device such as a mobile phone, and particularly relates to a camera module having a mechanical shutter.

BACKGROUND ART

In a camera module that uses a CCD (Charge Coupled Device) as an image capturing element, a phenomenon called "smear" occurs, for example. The smear is a phenomenon where, if intense light, such as the sun and an electric light, is included in a target subject, and enters into an image capturing element, a white strip-shaped part is generated in a captured image. The smear occurs due to a continuous overflow of charge in the CCD. Specifically, if a light receiving element (pixel) formed in the CCD receives intense light, the charge starts to overflow at a part of the light receiving element. As a result, in a charge exchange between the light receiving elements, the charge overflows in a chain reaction manner. Thus, the smear occurs.

In order to prevent such a smear, a camera module often includes a mechanical shutter. The mechanical shutter blocks the intense light, which causes the smear, before the smear is generated, so as to prevent an occurrence of the smear.

Figure 7:
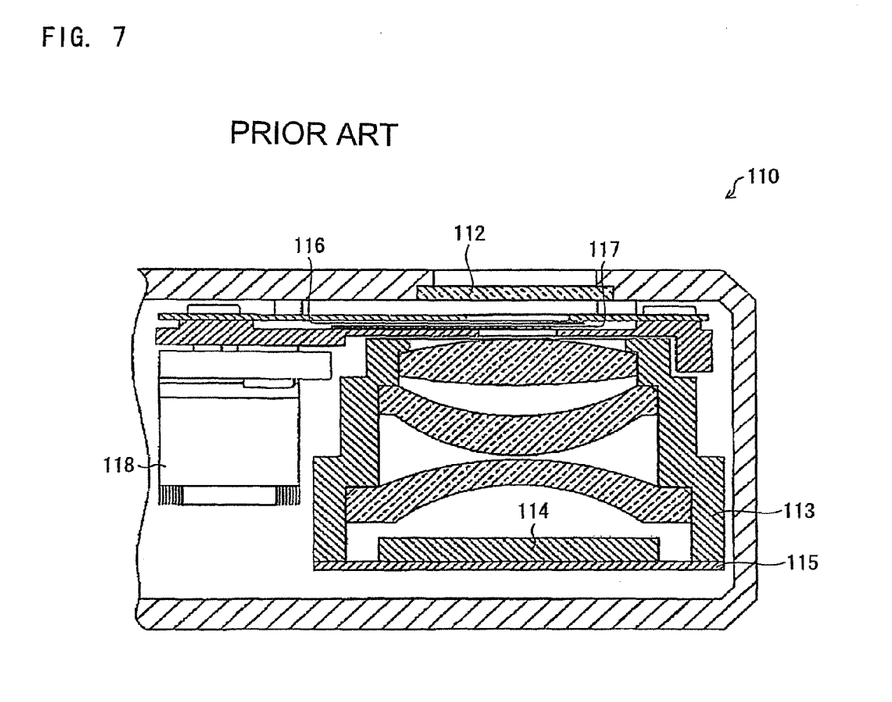
FIG. 7 is a cross-sectional view illustrating a camera module of Patent Literature 1.

For example, Patent Literatures 1 and 2 disclose camera modules each of which includes a mechanical shutter. FIG. 7 is a cross-sectional view illustrating a camera module disclosed in Patent Literature 1. Meanwhile, FIG. 8 is a cross-sectional view illustrating a mechanical shutter disclosed in Patent Literature 2.

Specifically, as illustrated in FIG. 7, a camera module 110 disclosed in Patent Literature 1 has an arrangement in which a light-transmitting plate 112, an image capturing optical system 113, an image capturing element 114, a substrate 115, shutter blades 116 and 117, and the like are assembled together in a direction of an optical axis. Further, a shutter actuator 118 for electromagnetically driving the shutter blades 116 and 117 is provided lateral to the image capturing optical system 113.

Figure 8:
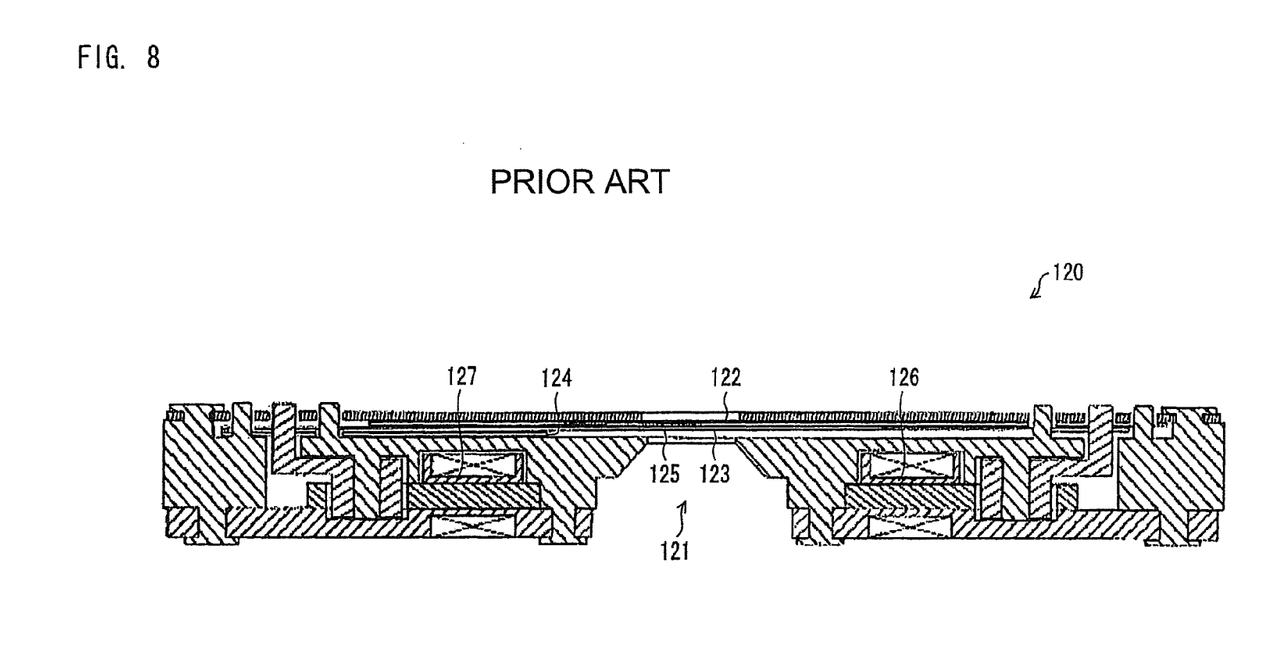
FIG. 8 is a cross-sectional view illustrating a mechanical shutter of Patent Literature 2.

On the other hand, as illustrated in FIG. 8, a mechanical shutter 120 for a camera module, disclosed in Patent Literature 2, has a depression section 121 in its central part. Further, drive mechanisms 126 and 127 for driving (i) a plurality of shutter blades 122 and 123, (ii) an aperture blade 124, and (iii) an auxiliary blade 125 are provided in such positions that the drive mechanism 126 is on one side of the depression section 121, and the drive mechanism 127 is on the other side. It should be noted that Patent Literature 2 does not clearly describe alignment of the members in the image capturing optical system, such as an image capturing lens.

Meanwhile, recently, there has been an increase in the number of cases where a camera module having an autofocus function is applied to a mobile phone. The autofocus function is realized by providing a camera module with a lens drive device. There are various types of the lens drive device, such as a VCM (Voice Coil Motor) type, a type for using a stepping motor, and a type for using a piezoelectric element. Such lens drive devices have been already on the market.

Figure 9:
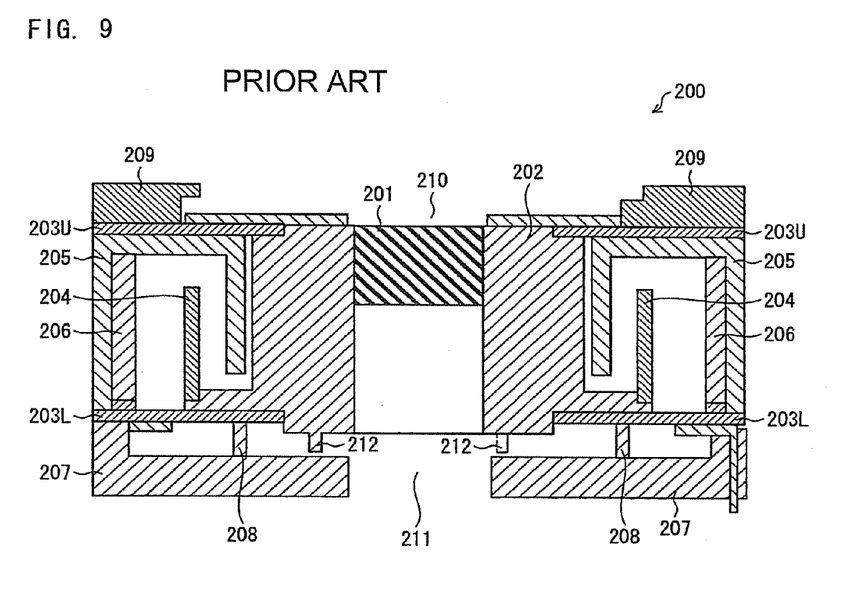
FIG. 9 is a cross-sectional view illustrating a lens drive device of Patent Literature 3.

For example, Patent Literature 3 discloses a VCM type lens drive device. FIG. 9 is a cross-sectional view illustrating a lens drive device disclosed in Patent Literature 3. A lens drive device 200 illustrated in FIG. 9 includes a holder 202 that includes a lens 201 in its central part. A plate spring 203U is provided on the holder 202, and a plate spring 203L is provided under the holder 202. This arrangement supports the holder 202 so that the lens 201 moves in the direction of the optical axis.

Further, a coil 204 is fixed to a flange section of the holder 202. The coil 204 is held in a yoke 205. On an inner surface of the yoke 205, a permanent magnet 206 is provided so as to face the coil 204 with a space therebetween. Such an arrangement enables the lens drive device 200 to be driven by electromagnetic power.

Meanwhile, three projections 208 are formed on a base 207. When the lens drive device 200 is completed, each of the projections 208 supports the holder 202.

An opening 210 is formed in a central part of a cover 209 provided above the yoke 205, and another opening 211 is formed in a central part of the base 207. The openings 210 and 211 are formed so as to transmit light.

However, the conventional camera module has a problem, that is, in a case where both a mechanical shutter and a lens drive device are provided to the camera module, it is impossible to cause the camera module to be smaller and thinner at the same time.

Specifically, in a case where, in order to cause the camera module 110 having the mechanical shutter (as illustrated in FIG. 7) to have the autofocus function, the camera module is provided with a lens drive device, the lens drive device has to (i) include the permanent magnet and the like, and (ii) be provided in the vicinity of the image capturing optical system 113. Further, the shutter actuator 118 should be provided lateral to the lens drive device. As a result, a size (lateral width) of the lens drive device becomes large.

On the other hand, in order not to have such an increase in size of a camera module, there may be another structure in which the mechanical shutter and the lens drive device are simply stacked with each other. An example of such an arrangement may be a camera module in which the mechanical shutter illustrated in FIG. 8 and the lens drive device illustrated in FIG. 9 are simply stacked with each other. However, such stacking increases a thickness of the lens drive device illustrated in FIG. 9 by a thickness of the mechanical shutter illustrated in FIG. 8.

The demand for a smaller and thinner device has increasingly grown, particularly for a mobile phone having a camera. Along with the demand, there is almost no space for a shutter actuator to be provided lateral to a lens drive device. Furthermore, the stacking of the mechanical shutter and the lens drive device goes against the demand for a thinner device.

CITATION LIST

International Publication No. WO 2005/036251 (Publication Date: Apr. 21, 2005)
Japanese Patent Application Publication, Tokukai, No. 2007-316477 A (Publication Date: Dec. 6, 2007)
Japanese Patent Application Publication, Tokukai, No. 2006-050693 A (Publication Date: Feb. 16, 2006)

SUMMARY OF INVENTION

The present invention is made in view of the problem. An object of the present invention is to cause a camera module including a mechanical shutter and a lens drive section to be smaller and thinner at the same time.

In order to attain the object, a camera module of the present invention includes: a lens drive section, including an image capturing lens, for driving the image capturing lens in a direction of an optical axis; a shutter section for controlling an amount of light that enters into the image capturing lens by opening or blocking a light path; and an image capturing element for converting an optical signal received via the image capturing lens into an electrical signal, the image capturing lens having, at its end, a protrusion section that protrudes from a top surface of the lens drive section, the shutter section being provided above the top surface of the lens drive section, and the shutter section having, on its back surface side, a depression section in which the protrusion section of the image capturing lens is held.

Since the camera module of the present invention includes the shutter section (mechanical shutter), it is possible to prevent an occurrence of a smear. Further, since the camera module includes the lens drive section, it is possible to realize a focus adjustment function by moving the image capturing lens in the direction of the optical axis.

According to the invention, in the camera module including the shutter section and the lens drive section, the shutter section is provided above the top surface of the lens drive section. For this reason, the shutter section thus provided does not increase a width of the lens drive section. Therefore, even if a camera module includes the shutter section, there is no increase in size of the camera module.

Moreover, according to the invention, the image capturing lens has the protrusion section at its end, and the protrusion section protrudes from the top surface of the lens drive section. In other words, the top surface of the lens drive section is located lower than the protrusion section of the image capturing lens. Further, the protrusion section of the image capturing lens is held in the depression section formed on the back surface of the shutter section. Therefore, after the shutter section is provided above the top surface of the lens drive section, a total thickness (apparent thickness) of the shutter section and the lens drive section will become shorter than a total thickness of an independent shutter section and an independent lens drive section (that is, before the shutter section is provided to the lens drive section) by a length from the protrusion section of the image capturing lens down to the top surface of the lens drive section. Accordingly, even if the shutter section is provided above the lens drive section, it is possible to suppress an increase in thickness of the camera module.

As described above, according to the invention, it is possible to cause a camera module including a mechanical shutter and a camera module to be smaller and thinner at the same time.

Additional objects, features, and strengths of the present invention will be made clear by the description below. Further, the advantages of the present invention will be evident from the following explanation in reference to the drawings.

DESCRIPTION OF EMBODIMENTS

Figure 1:
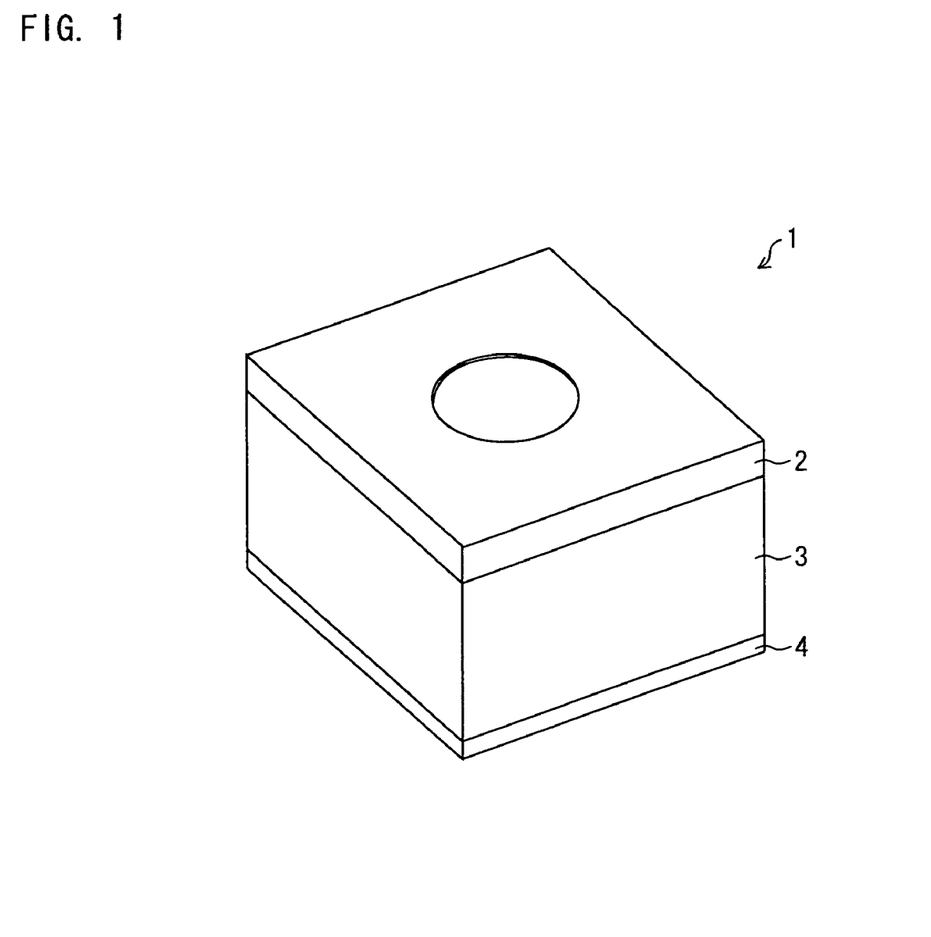
FIG. 1 is a perspective view illustrating a camera module of the present invention.

One embodiment of the present invention is described below with reference to the attached drawings. FIG. 1 is a perspective view illustrating a camera module of the present invention, including a lens drive device.

As illustrated in FIG. 1, a camera module 1 in accordance with the present embodiment has a three-layer structure in which a mechanical shutter (shutter section) 2, a lens unit (lens drive section) 3, and an image capturing unit 4 are assembled with each other in this order in a direction of an optical axis. Further, the camera module 1 in accordance with the present embodiment includes a magnetic shield plate 5 (described later) between the mechanical shutter 2 and the lens unit 3. In the following explanations, a mechanical shutter 2 side is referred to as an upper side, and an image capturing unit 4 side is referred to as a lower side for explanatory convenience.

[Mechanical Shutter 2]

Figure 3:
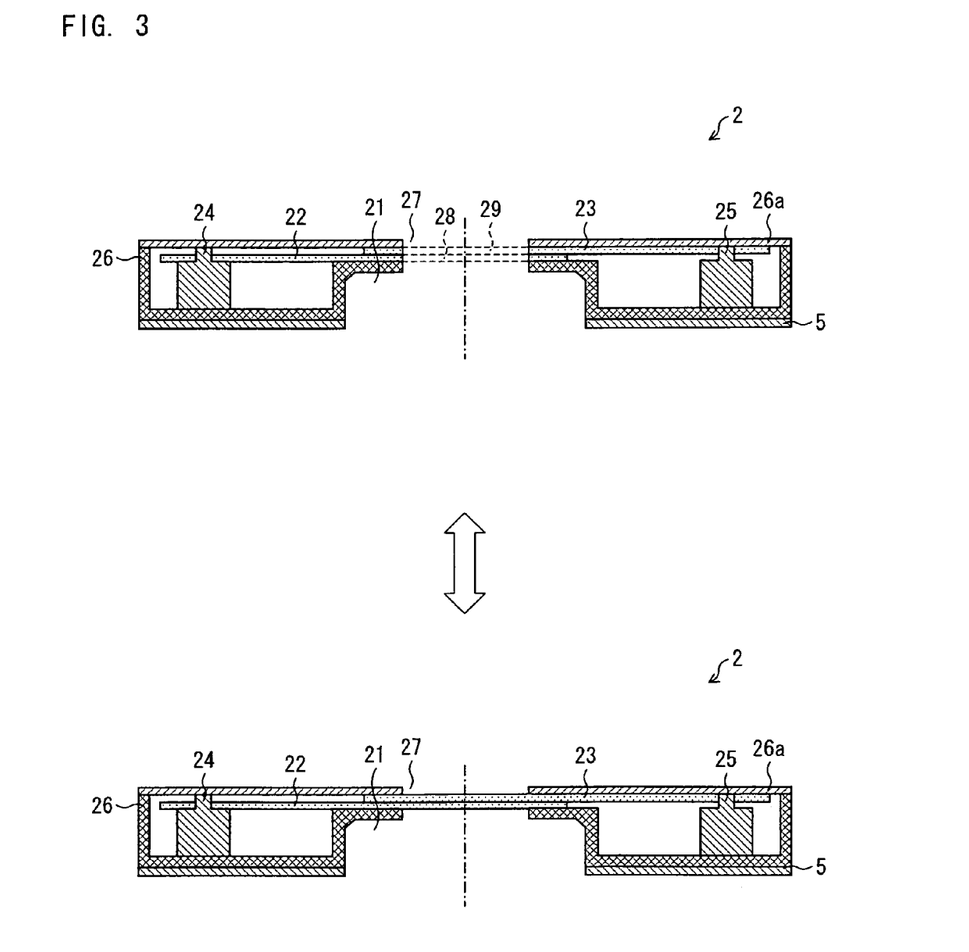
FIG. 3 is a cross-sectional view illustrating a mechanical shutter included in the camera module illustrated in FIG. 1.

FIG. 3 is a cross-sectional view illustrating the mechanical shutter 2. An upper section of FIG. 3 shows a state where a light path is opened, and a lower section of FIG. 3 shows a state where the light path is blocked. The mechanical shutter 2 carries out ON/OFF control with respect to light entering into an image capturing lens that is provided to the lens unit 3. Specifically, the mechanical shutter 2 has a depression section 21 in a central part of its back surface (a surface facing the lens unit 3). On opposite two sides of the depression section 21, a plurality of (2 blades in FIG. 3) shutter blades 22 and 23 are provided respectively, and also drive mechanisms 24 and 25 for driving the shutter blades 22 and 23 are provided respectively.

The shutter blades 22 and 23, and the drive mechanisms 24 and 25 are held and fixed in a hollow housing 26. This housing 26 itself has such an arrangement that the depression section 21 is formed in a central part of its back surface. Further, a cover 26a is provided on a top surface of the housing 26 so as to prevent foreign matters from entering the housing 26.

An opening 27 is formed in the central part of the housing 26 so as to transmit light and secure a light path (illustrated in a dashed-dotted line in FIG. 3). The shutter blades 22 and 23 also have openings 28 and 29, respectively, through which the light path passes. If the drive mechanisms 24 and 25 are activated, the shutter blades 22 and 23 turn (oscillate) on the drive mechanisms 24 and 25, respectively, along a plane perpendicular to the light path. Then, as illustrated in the upper section of FIG. 3, when the opening 27 of the housing 26, the opening 28 of the shutter blade 22, and the opening 29 of the shutter blade 23 overlap each other, the light path is opened. This allows external light to enter into the lens unit 3 via the mechanical shutter 2.

On the other hand, as illustrated in the lower section of FIG. 3, in a state where the opening 27 of the housing 26, the opening 28 of the shutter blade 22, and the opening 29 of the shutter blade 23 do not overlap each other, the external light is blocked, and therefore does not enter into the lens unit 3. Thus, the mechanical shutter 2 controls the light to enter into the lens unit 3 (ON state) or to be blocked (OFF state) by driving the shutter blades 22 and 23.

The shutter blades 22 and 23 are not limited to the arrangement in which the shutter blades 22 and 23 have the openings 28 and 29 respectively. The light may be controlled to enter into the lens unit 3 (ON state) or to be blocked (OFF state) in such a manner that the shutter blades 22 and 23 themselves are positioned to block the light path, or positioned to open the light path.

Further, one of the shutter blades 22 and 23 may be replaced with an ND (Neutral Density) filter, so that absence/presence of a filter function can be switched over to each other. Furthermore, in the above example, two shutter blades 22 and 23, or one of the shutter blades and the ND filter, are provided. However, the total number of the shutter blades (and the ND filter) is not limited to two, and may be more than two.

Although details of the drive mechanisms 24 and 25 are not illustrated, the drive mechanisms may have a moving magnet type arrangement, or a moving coil type arrangement. If the drive mechanisms 24 and 25 are of the moving magnet type, the shutter blades 22 and 23 are driven such that rotational energy is obtained by providing magnets as rotors. On the other hand, if the drive mechanisms 24 and 25 are of the moving coil type, the shutter blades 22 and 23 are driven such that the rotational energy is obtained by providing coils as moving sections.

In the present embodiment, the magnetic shield plate 5 is attached to the entire back surface of the mechanical shutter 2 (housing 26).

[Lens Unit 3]

Figure 4:
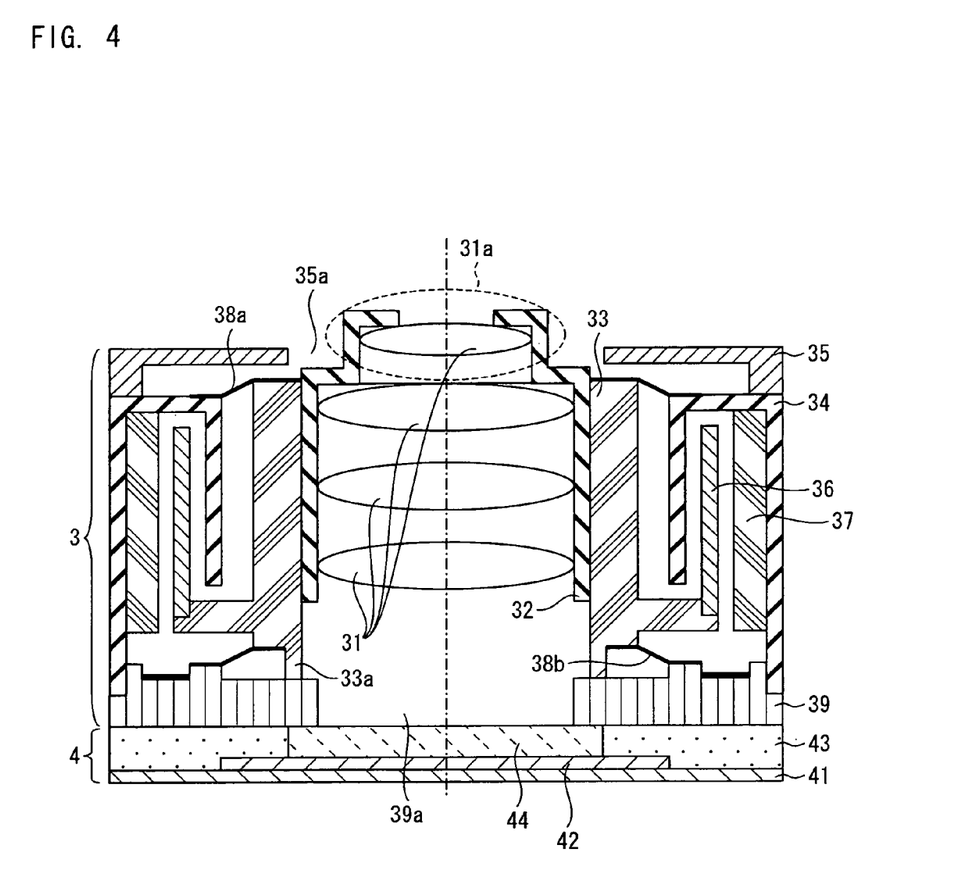
FIG. 4 is a cross-sectional view illustrating a lens unit and an image capturing unit, both of which are to be included in the camera module illustrated in FIG. 1.

Next, the following description deals with the lens unit 3. FIG. 4 is a cross-sectional view illustrating the lens unit 3 and the image capturing unit 4. The lens unit 3 is an image capturing optical system that forms a subject image. That is, the lens unit 3 leads the external light to a light receiving surface (image capturing surface) of the image capturing unit 4. The lens unit 3 is constituted by: a moving section which moves in the direction of the optical axis; a holding section in which the moving section is held; and a drive section for driving the moving section to move in the direction of the optical axis.

Specifically, as illustrated in FIG. 4, the lens unit 3 is arranged such that a lens barrel 32 in which a lens 31 (a plurality of lenses) (image capturing lens) is held is fixed in a lens holder 33, and these members are held in a space surrounded by a base 39, a yoke 34, and a cover 35. In the present embodiment, the lens barrel 32 having the lens 31 (a plurality of lenses) is fixed to the lens holder 33. However, one of the lens barrel 32 and the lens holder 33 may be provided with a male screw, and the other may be provided with a female screw, so as to make it possible to control a height of the lens barrel 32.

The lens barrel 32 is a frame in which the lens 31 is held. Meanwhile, the lens barrel 32 holding the lens 31 is held in the lens holder 33. The lens 31 is arranged to be in a central part of the lens barrel 32, and also in a central part of the lens holder 33. Both of the lens barrel 32 and the lens holder 33 are hollow (tubular) members.

As will be described later, an end of the lens 31 (an end of the lens 31 and an end of the lens barrel 32) constitutes a protrusion section 31a which protrudes from a top surface (upper surface of the cover 35) of the lens unit 3. This protrusion section 31a will be held in the depression section 21 of said mechanical shutter 2.

As will be described later, the lens 31, the lens barrel 32, and the lens holder 33 can be moved in the direction of the optical axis, so as to constitute the moving section. This moving section is held in the holding section. Specifically, the holding section is constituted by the base 39, the yoke 34, and the cover 35. The base 39 constitutes a bottom section of the lens unit 3. That is, the base 39 is provided on a light emitting side of the lens unit 3.

The yoke 34 is a tubular member, and constitutes a side surface section of the lens unit 3. The moving section is held in the yoke 34. The yoke 34 is fixed on the base 39. In the present embodiment, the cover 35 is provided above the yoke 34. The cover 35 constitutes an upper section (top surface) of the lens unit 3. The cover 35 may be omitted if the yoke 34 itself is also used as the cover. In this case, an inner diameter of an opening 35a will be the same as an inner diameter of the yoke 34.

The base 39 has an opening 39a in its central part. Further, the cover 35 has the opening 35a in its central part. The openings 39a and 35a are formed to transmit light, and are aligned in the direction of the light axis. Thus, in the holding section, in the direction of the light axis, the opening 35a is formed on a side from which light enters, and the opening 39a is formed on a side from which the light exits. Therefore, the light path is secured. For this reason, the lens 31, the lens barrel 32, and the lens holder 33 are partially exposed from the opening 35a.

Next, the drive section is constituted by the coil 36 and the permanent magnet 37. In the present embodiment, electromagnetic force generated from an interaction between the coil 36 and the permanent magnet 37 makes it possible to drive the lens 31 (lens holder 33) to move in the direction of the optical axis. The coil 36 is fixed to a flange section of the lens holder 33. The coil 36 is provided so as to extend toward the side (opening 35a side) from which the light enters. Meanwhile, a magnetic circuit constituted by the permanent magnet 37 is provided on an inner surface of the yoke 34 so as to face the coil 36.

Further, in the lens unit 3 of the present embodiment, a plate spring 38a is provided on the upper surface (top surface) of the lens holder 33, and a plate spring 38b is provided on the lower surface (bottom surface) of the lens holder 33. The plate springs 38a and 38b are a pushing section for pushing the moving section toward the side from which the light exits. The plate springs 38a and 38b have spiral patterns respectively. Each of the plate springs 38a and 38b only has to be arranged such that one end is fixed to the moving section, and the other end is fixed to the holding section. In the present embodiment, each of the plate springs 38a and 38b is arranged such that one end is fixed to the yoke 34 or the base 39, and the other end is fixed to the lens holder 33. The plate springs 38a and 38b secondarily helps the lens holder 33 move in the direction of the light axis with the use of elastic force.

[Image Capturing Unit 4]

Next, the following description deals with an arrangement of the image capturing unit 4. As illustrated in FIG. 4, the image capturing unit 4 is provided on a bottom surface side of the lens unit 3. The image capturing unit 4 is an image capturing section for converting, into an electrical signal, a subject image formed by the lens unit 3. That is, the image capturing unit 4 is a sensor device which carries out photoelectric conversion with respect to the light entering via the lens unit 3.

As illustrated in FIG. 4, the image capturing unit 4 includes a solid-state image capturing element 42 on a wiring substrate 41. Further, the solid-state image capturing element 42 is held in a holder 43 provided on the wiring substrate 41. An upper section of the holder 43 is provided with a light-transmitting member 44 for covering a light receiving section of the solid-state image capturing element 42.

The wiring substrate 41 is a substrate having a patterned wiring (not illustrated). This wiring electrically connects the solid-state image capturing element 42 to the wiring substrate 41. The wiring substrate 41 may be, for example, a print substrate, or a ceramic substrate.

The solid-state image capturing element 42 converts the subject image formed by the lens unit 3 into an electrical signal. That is, the solid-state image capturing element 42 is a sensor device which converts an optical signal received via the lens 31 of the lens unit 3 into an electrical signal. The solid-state image capturing element 42 may be, for example, a CCD or CMOS sensor IC. On a surface (top surface) of the solid-state image capturing element 42, a light receiving surface (not illustrated) in which a plurality of pixels are arranged in a matrix pattern is formed. This light receiving surface is a region on which the light entering from the lens unit 3 is imaged, and may be called a "pixel area".

The solid-state image capturing element 42 converts the subject image that is imaged on the light receiving surface (pixel area) into an electrical signal, and then outputs the electrical signal as an analogue image signal. In other words, the photoelectric conversion is carried out on the light receiving surface. Operation of the solid-state image capturing element 42 is controlled by a DSP (not illustrated), and the image signal created by the solid-state image capturing element 42 is processed by the DSP.

The light transmitting member 44 is made from, for example, glass, and covers the light receiving surface of the solid-state image capturing element 42. In the present embodiment, an infrared radiation blocking film (IR cut film) is formed on a surface of the light transmitting member 44. Because of this, the light transmitting member 44 also has a function of blocking the infrared radiation.

[Magnetic Shield Plate 5]

Next, the following description deals with the magnetic shield plate 5. The camera module 1 of the present embodiment is of a VCM type in which the lens unit 3 drives the moving section by use of the permanent magnet 37. Since the VCM type employs the permanent magnet 37, a leakage of a magnetic field occurs. Meanwhile, in a case where the drive mechanisms 24 and 25 of the mechanical shutter 2 are also of an electromagnetic drive type, there is a risk that the leakage of the magnetic field of the lens unit 3 causes a change in timing at which the shutter blades 22 and 23 are closed, or a malfunction in the turning (opening and closing) of the shutter blades 22 and 23.

Thus, in a case where both the mechanical shutter 2 and the lens unit 3 are of the electromagnetic drive type, the magnetic shield plate 5 is provided so as to aim at a reduction in the influence of the leakage of the magnetic field. Further, it is preferable to provide the magnetic shield plate 5 between the mechanical shutter 2 and the lens unit 3. This can successfully reduce the influence of the leakage of the magnetic field.

A thickness or an area of the magnetic shield plate 5 can be adjusted arbitrarily in accordance with strength of the leakage of the magnetic field of the lens unit 3, and/or strength of resistance properties (of the mechanical shutter 2) with respect to the magnetic field.

As described above, since the camera module 1 of the present embodiment includes the mechanical shutter 2, it is possible to prevent an occurrence of the smear. Further, since the camera module 1 includes the lens unit 3, it is possible to realize a focus adjustment function by moving the lens 31 in the direction of the light axis.

Furthermore, in the camera module 1, the mechanical shutter 2 is provided above the top surface of the lens unit 3. For this reason, there is no increase in the width of the lens unit 3 if the mechanical shutter 2 is provided. Accordingly, the camera module 1 is prevented from being larger in size.

Moreover, the end (the end of the lens 31 and the end of the lens barrel 32) of the lens 31 constitutes the protrusion section 31a which sticks out from the top surface (the upper surface of the cover 35) of the lens unit 3. This protrusion section 31a also protrudes from the opening 35a of the top surface (the upper surface of the cover 35) of the lens unit 3. In other words, the top surface (the upper surface of the cover 35) of the lens unit 3 is located lower than the protrusion section 31a of the lens 31. Further, the protrusion section 31a of the lens 31 is held in the depression section 21 formed on the back surface of the mechanical shutter 2. Therefore, if the mechanical shutter 2 is provided above the top surface of the lens unit 3, a total thickness (apparent thickness) of the mechanical shutter 2 and the lens unit 3 becomes shorter than a total thickness of an independent mechanical shutter 2 and an independent lens unit 3 by a length from the protrusion section 31a down to the top surface of the lens unit 3. Accordingly, it is possible to suppress an increase in thickness of the camera module 1, even if the mechanical shutter 2 is provided above the lens unit 3.

That is, the camera module 1 is arranged such that a part of the lens 31 and a part of the lens barrel 32 (end section) protrude from the upper surface of the lens unit 3, and are arranged inside the depression section 21 of the mechanical shutter 2. With such an arrangement, a dead space of the mechanical shutter 2 is efficiently used, so that the thickness of the camera module 1 can be reduced as compared with a case where the mechanical shutter 2 and the lens unit 3 are simply stacked with each other. Further, since the mechanical shutter 2 and the lens unit 3 are stacked with each other, the camera module 1 can be reduced in size as compared with a camera module having a conventional arrangement in which the drive mechanism of the mechanical shutter 2 is provided lateral to the lens unit 3.

Therefore, the camera module 1 including the mechanical shutter 2 and the lens unit 3 can be smaller and thinner at the same time.

Figure 2:
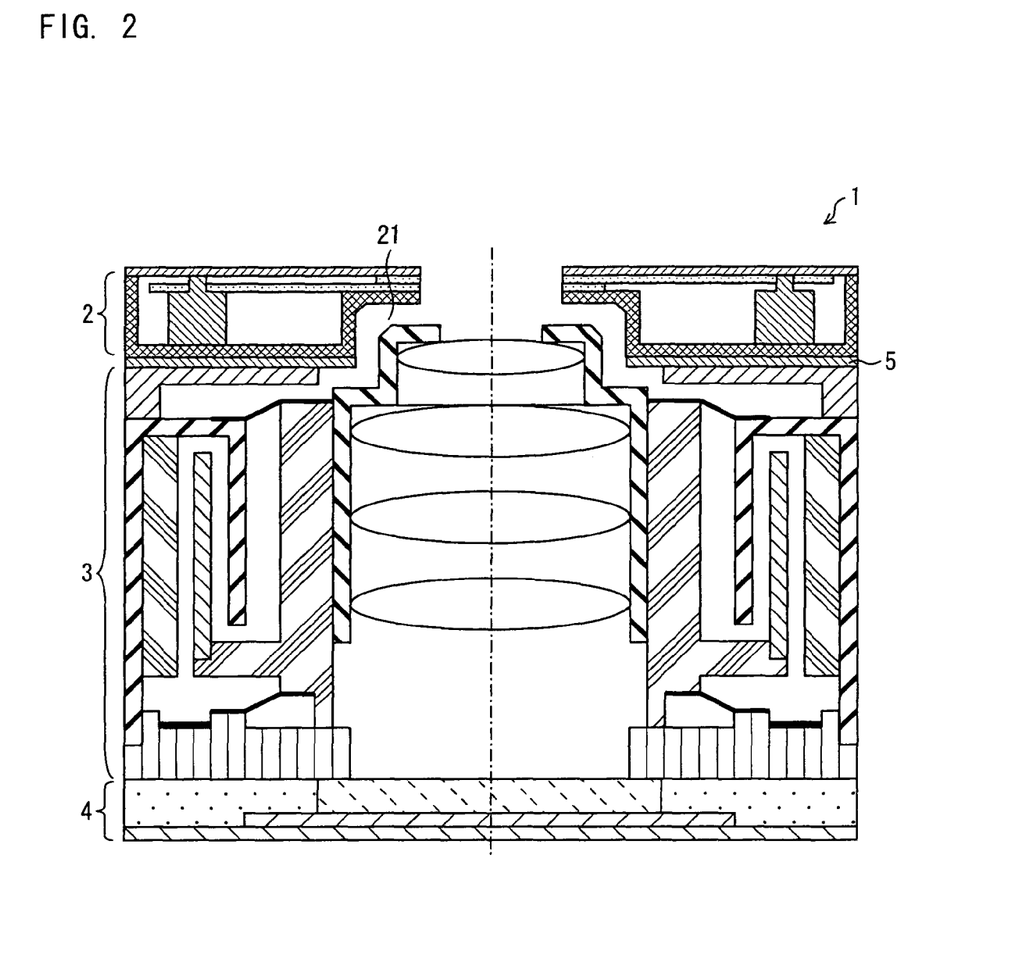
FIG. 2 is a cross-sectional view illustrating the camera module illustrated in FIG. 1.

Here, FIG. 2 is a view illustrating a state where the drive section of the lens unit 3 is not activated (stationary state: home position). On the other hand, FIG. 5 is a cross-sectional view illustrating a state where the drive section of the lens unit 3 is activated, and therefore the lens 31 (lens holder 33) has moved to its highest position.

Figure 5:
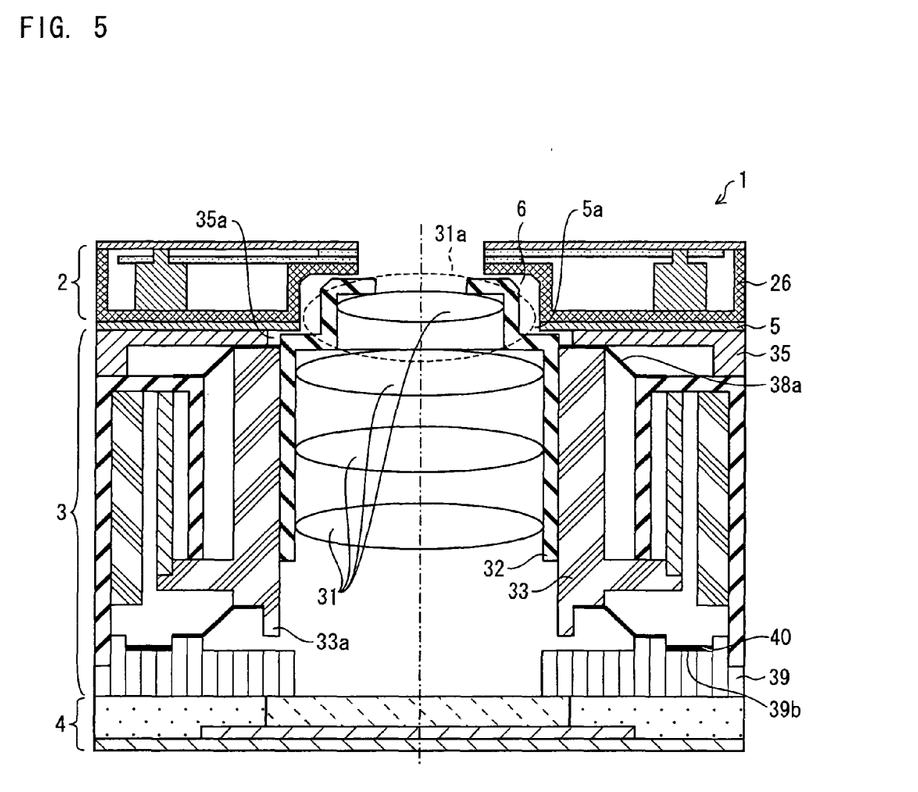
FIG. 5 is a cross-sectional view illustrating the camera module illustrated in FIG. 1, in a state where an image capturing lens has moved to its highest position.

Further, as illustrated in FIG. 5, in the camera module 1 of the present embodiment, the lens unit 3 drives the lens 31 so that the lens 31 does not touch the mechanical shutter 2 throughout a moving range of the lens 31.

If the lens 31 is driven as described above, the lens 31 does not touch the mechanical shutter 2 throughout the moving range of the lens 31. That is, there is always a space between the lens 31 and the mechanical shutter 2. For this reason, the lens 31 does not touch the mechanical shutter 2 even if the lens 31 is moved in the direction of the optical axis so as to adjust a focal length. Accordingly, it becomes possible to prevent the lens 31 from being at a wrong position (a failure in the focus adjustment).

Further, in the camera module 1 of the present embodiment, the lens unit 3 drives, by the electromagnetic force, the lens 31 to move in the direction of the optical axis. Furthermore, the mechanical shutter 2 blocks/opens the light path by use of the electromagnetic force. The magnetic shield plate 5 is provided between the lens unit 3 and the mechanical shutter 2.

If both the lens unit 3 and the mechanical shutter 2 are driven by use of the electromagnetic force, as described above, there is a risk that the magnetic field used in driving the lens unit 3 is leaked, and the leakage of the magnetic field causes a malfunction of the mechanical shutter 2.

However, in the camera module 1, the magnetic shield palate 5 is provided between the lens unit 3 and the mechanical shutter 2. Accordingly, the magnetic shield plate 5 reduces the leakage of the magnetic field from the lens unit 3 to the mechanical shutter 2, or the leakage of the magnetic field from the mechanical shutter 2 to the lens unit 3. Therefore, it becomes possible to prevent a malfunction of the lens unit 3, or a malfunction of the mechanical shutter 2, due to the leakage of the magnetic field.

In the explanations of the present embodiment, the lens drive device is of the VCM type, which is the electromagnetic drive type. However, the lens drive device of the present invention is not limited to this. The present invention may be applied to lens drive devices of other types. Particularly, in a case where a lens drive device that is not of the electromagnetic type is used, it is not necessary to provide the magnetic shield plate 5. This is because, with such a lens drive device, there is no problem regarding the leakage of the magnetic field. This allows a camera module to be further thinner.

Moreover, in the camera module 1 of the present embodiment, the lens unit 3 drives the lens 31 so that the lens 31 does not touch the magnetic shield plate 5 throughout the drive range of the lens 31.

If the lens 31 is thus driven, the lens 31 does not touch the magnetic shield plate 5 throughout the drive range of the lens 31. That is, there is always a space between the lens 31 and the magnetic shield plate 5. This causes the lens 31 not to touch the magnetic shield plate 5. Accordingly, it becomes possible to prevent the lens 31 from being at a wrong position (a failure in the focus adjustment).

Thus, in the camera module 1 of the present embodiment, if the lens 31 is driven to be in such a direction that the focal length becomes long (upward direction in FIG. 5), a stopper mechanism of the lens unit 3 operates at a predetermined stroke amount. Specifically, in the example illustrated in FIG. 5, the plate spring 38a fixed to the upper surface of the lens holder 33 touches the cover 35 so as to function as the stopper mechanism. This state is a state where the lens 31 is at its highest position. In this state, a space is secured between the lens barrel 32 and the mechanical shutter 2 (housing 26), and another space is secured between the lens barrel 32 and the magnetic shield plate 5. That is, the lens barrel 32 is not directly given an impact due to a collision. If the lens barrel 32 is given a direct impact, there is a risk that a focus position of the lens 31 changes. However, the camera module 1 is not affected by such an impact. Therefore, it becomes possible to prevent a change in the focus position.

In the camera module 1 of the present embodiment, the magnetic shield 5 has an opening 5a through which the light path passes, and a diameter (inner diameter) of the opening 5a is arranged to be shorter than a diameter (inner diameter) of the opening 35a of the lens unit 3, and is longer than a diameter (inner diameter) of the protrusion section 31a of the lens 31. In other words, the diameter (inner diameter) of the opening 5a is almost the same as an inner diameter of the depression section 21 of the mechanical shutter 2.

Here, a method of providing the magnetic shield plate 5 may be, for example, (i) a method of providing the magnetic shield plate 5 after the lens unit 3 is provided on the image capturing unit 4, or (ii) a method in which the magnetic shield plate 5 is attached to either the lens unit 3 or the mechanical shutter 2, and therefore the mechanical shutter 2 is provided on the lens unit 3 at the same time the magnetic shield plate 5 is provided on the lens unit 3. For an easy manufacturing process, the latter is preferable.

However, the lens barrel 32 having the lens 31 is fitted to the lens holder 33 after the base 39 and the like are attached onto the image capturing unit 4. As illustrated in FIG. 5, in order to cause the diameter of the opening 5a of the magnetic shield plate 5 to be shorter than the diameter of the opening 35a of the lens unit 3, and longer than the diameter of the protrusion section 31a of the lens 31, the magnetic shield plate 5 should be attached to the back surface of the mechanical shutter 2, and therefore the mechanical shutter 2 is provided on the lens unit 3 at the same time the magnetic shield plate 5 is provided on the lens unit 3.

As illustrated in FIG. 5, if the diameter of the opening 5a of the magnetic shield plate 5 is arranged to be shorter than the diameter of the opening 35a of the lens unit 3, and longer than the diameter of the protrusion section 31a of the lens 31, it becomes possible to cause the diameter of the opening 5a of the magnetic shield 5 to be shorter. That is, it is possible to cause an area of the magnetic shield plate 5 to be larger. Therefore, it becomes possible to increase a magnetic shield effect generated by the magnetic shield plate 5. In this case, the magnetic shield plate 5 may be provided in such a manner that (i) the magnetic shield plate 5 is attached to the mechanical shutter 2 in advance, (ii) the lens barrel 32 is attached to the lens unit 3, (iii) processing, such as focus adjusting, and fixing, is carried out, and finally (iv) the mechanical shutter 2 and the magnetic shield plate 5 are provided so as to cover the lens unit 3.

Figure 6:
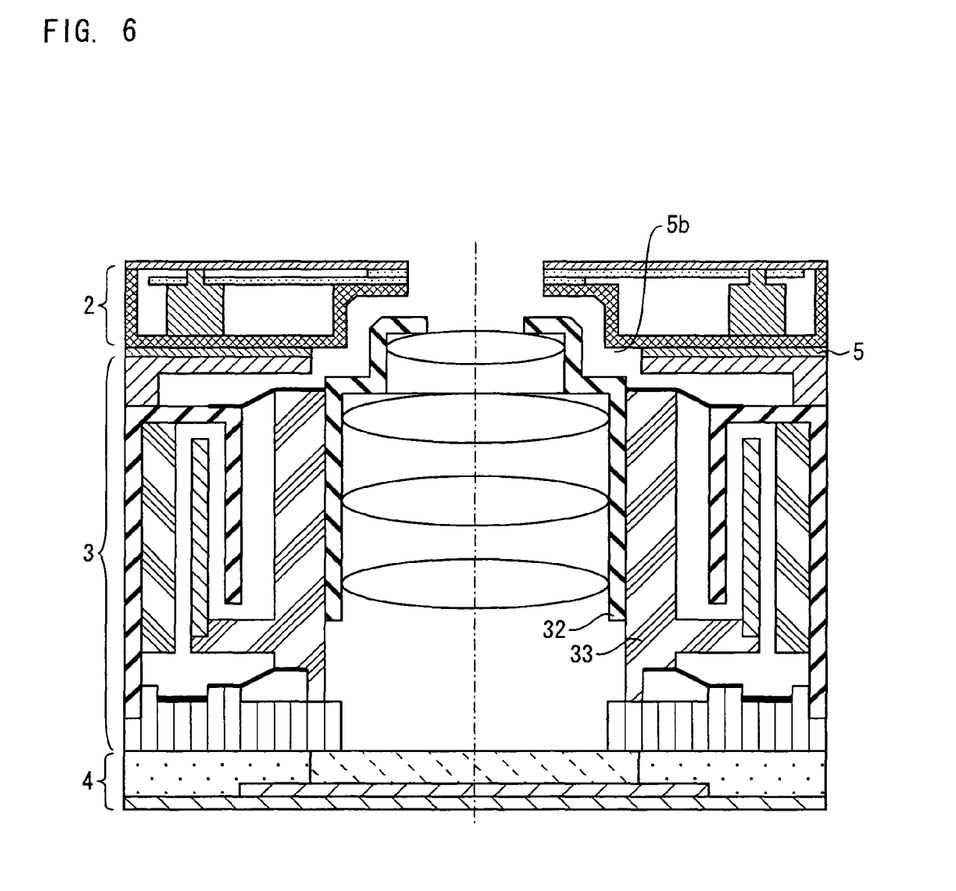
FIG. 6 is a cross-sectional view illustrating another arrangement of a camera module of the present invention.

FIG. 6 is a view illustrating an arrangement in another case where the magnetic shield plate 5 is attached to the top surface of the lens unit 3 in advance, and therefore the mechanical shutter 2 is provided on the lens unit 3 at the same time the magnetic shield plate 5 is provided on the back surface of the mechanical shutter 2. The opening 5b of the magnetic shield plate 5, illustrated in FIG. 6, becomes larger than the opening 5a of the magnetic shield plate 5, illustrated in FIG. 5. That is, the opening 5b of the magnetic shield plate 5 becomes larger than an external diameter (the inner diameter of the lens holder 33) of the lens barrel 32. Therefore, the opening 5b becomes larger than the opening 5a illustrated in FIG. 5. In other words, the area of the magnetic shield plate 5 becomes smaller. Accordingly, the magnetic shield effect generated by the magnetic shield plate 5 illustrated in FIG. 6 is relatively less than the magnetic shield effect generated by the magnetic shield plate 5 illustrate in FIG. 5.

It should be noted, however, that, in a case of the arrangement illustrated in FIG. 5, a back surface of the magnetic shield plate 5 is partially exposed from the top surface of the lens unit 3, meanwhile, in a case of the arrangement illustrated in FIG. 6, almost no part of the magnetic shield plate 5 is exposed. That is, in the case of the arrangement illustrated in FIG. 6, the entire upper surface (front surface) and entire lower surface (back surface) of the magnetic shield plate 5 are in contact with the back surface of the mechanical shutter 2 or the top surface of the lens unit 3. Therefore, in the arrangement illustrated in FIG. 6, there is almost no risk that light reflected from the magnetic shield plate 5 becomes stray light, even if the magnetic shield plate 5 is a shiny member.

Thus, in the case of the arrangement illustrated in FIG. 6, the magnetic shield plate 5 is attached to the top surface of the lens unit 3 before the lens barrel 32 is attached to the lens unit 3. In this case, in order to attach the lens barrel 32 to the lens unit 3, the magnetic shield plate 5 has the opening 5*b* having a diameter larger than the external diameter of the lens barrel 32.

As illustrated in FIG. 5, in the camera module 1 of the present embodiment, the openings (opening 35*a* on a side from which light enters, opening 39*a* on a side from which light exits) are formed at both ends of the lens unit 3 in the direction of the optical axis. This generates a possibility that a foreign matter enters into the lens unit 3 from outside via the opening 35*a* on the side from which light enters. Further, there is another possibility that a foreign matter is generated inside the lens unit 3. Furthermore, there is a case where such a foreign matter goes outside from the opening 39*a* on the side from which light exits.

Specifically, in a case where a foreign matter enters the lens unit 3 via the opening 35*a* of the cover 35, or in a case where a foreign matter falls off inside the lens unit 3, there is a possibility that such a foreign matter reaches the base 39 via (i) a space between the coil 36 and the yoke 34, or another space between the coil 36 and the permanent magnet 37, or (ii) a space in the pattern of the plane spring 38*a*, or another space in the pattern of the plane spring 38*b*, for example. If the foreign matter reaches the case 39, and then enters the light path via the opening 39*a* on the side from which light exits, the foreign matter may cause a spot defect.

Therefore, the lens unit 3 is provided with the following measures against a foreign matter. That is, the lens unit 3 is provided with a projection 33*a* on the lens holder 33, as a measure against such a foreign matter. The projection 33*a* is formed in a circular shape on the bottom surface of the lens holder 33. That is, an inner diameter of the projection 33*a* is larger than the opening 39*a* (on the side from which light exits) of the base 39. Further, the projection 33*a* is formed so as to surround the opening 39*a* (a whole circumference of the opening 39*a*). This causes a space in which the foreign matter moves toward the opening 39*a* to be narrower. That is, the projection 33*a* prevents the foreign matter from moving toward the opening 39*a* from a place on the base 39*a*. Accordingly, it is possible to largely reduce the possibility that the foreign matter existing inside the lens unit 3 goes out from the opening 39*a*.

In a case where the foreign matter goes out from the opening 39*a*, and falls downwardly, the foreign matter will be attached to the solid-state image capturing element 42 or the light transmitting member (cover glass) 44, both of which are provided below the lens unit 3. For this reason, the foreign matter thus attached is recognized as an image, and therefore causes a spot. The projection 33*a* can largely reduce the occurrence of such a spot.

Thus, in the lens unit 3, the projection 33*a* surrounds the opening 39*a* provided on the side from which light enters. Further, the projection 33*a* is formed so as to block a path via which the foreign matter goes out from the opening 39*a*. Accordingly, it becomes possible to reduce the possibility that the foreign matter goes out from the opening 39*a*.

Further, the lens unit 3 of the present embodiment is arranged such that the lens 31 (lens holder 33) is moved in the direction of the optical axis by use of the electromagnetic force. As described above, FIG. 2 illustrates the state where the drive section is not activated, and the lens 31 (lens holder 33) has not moved (stationary state: home position). On the other hand, FIG. 5 illustrates the state where the drive section is activated, and the lens 31 (lens holder 33) has moved to its highest position. That is, the state illustrated in FIG. 2 is a state where the lens function is not used, and the state illustrated in FIG. 5 is a state where the lens function is being used.

The lens 31 (lens holder 33) moves in the direction of the optical axis when the lens unit 3 that is being in the stationary state illustrated in FIG. 2 is affected by the electromagnetic force. This causes the lens holder 33 to be held up to a point where the lens holder 33 becomes in the vicinity of the cover 35, or the lens holder 33 becomes in contact with the cover 35, as illustrated in FIG. 5. Further, in the lens unit 3, in the stationary state where the lens function is not being used, the projection 33*a* and the base 39 are in contact with each other, as illustrated in FIG. 2. In other words, the projection 33*a* and the base 39 are in contact with each other in the state where the drive section is not activated. This causes, in the stationary state, the projection 33*a* to block a path via which the foreign matter moves. Accordingly, it becomes possible to successfully reduce the possibility that the foreign matter goes out from the opening 39*a*.

Furthermore, if the lens unit 3 is in the stationary state illustrated in FIG. 2, the projection 33*a* is in contact with the base 39, at the same time the lens holder 33 is pressed downwardly by elastic force of the plate springs 38*a* and 38*b*. That is, the plate springs 38*a* and 38*b* press the lens holder 33 so as to push the lens holder 33 toward the side from which light exits. This makes it possible to successfully cause the projection 33*a* to be in contact with the base 39. Because of this, the projection 33*a* successfully blocks the path via which the foreign matter moves. Accordingly, it becomes possible to successfully reduce the possibility that the foreign matter enters/goes out from each of the openings. Therefore, it is possible to successfully reduce the possibility that the foreign matter goes out from the opening 39*a*.

It should be noted that, in the state illustrated in FIG. 5, the projection 33*a* does not generate the effect (a cover effect with respect to the opening 39*a*) of blocking the path via which the foreign matter moves toward the opening 39*a* on the base 39*a*. However, in an actual camera module 1, a period during which the lens function is not being used is much longer than a period during which the lens function is being used (an operation period of the autofocus function, for example). In other words, the lens function is not used most of the time. For this reason, the projection 33*a* only has to block the path via which the foreign matter moves at least in the stationary state. This can sufficiently reduce the possibility that the foreign matter goes out from the opening 39*a*. Further, it is also possible to prevent the foreign matter from falling toward the solid-state image capturing element 42, or the light transmitting member (cover glass) 44.

Furthermore, in the camera module 1, a groove 39*b* is formed on the upper surface of the base 39 in the vicinity directly below the permanent magnet 37 and the coil 36, and an adhesive dust trap material 40 is applied to a surface of the groove 39*b*. Specifically, in the lens unit 3, the groove 39*b* is formed on a surface of the base 39, which surface faces the bottom surface of the lens holder 33. Further, a protrusion section is formed on the surface of the base 39, and the plate spring 38*b* is provided to the protrusion section. This arrangement in which the base 39 has a concavity/convexity shape causes the path via which the foreign matter moves from the base 39 toward the opening 39*a* on the side from which light exits to be complicated. Therefore, it becomes possible to successfully prevent the foreign matter from going out from the opening 39*a* on the side from which light exits.

It should be noted that the groove 39*b* and the protrusion section may be formed so as to surround entirely the opening 39*b*, or may be formed so as to partially surround the opening

39b. Further, more complicated the concavity/convexity shape becomes, more successfully the foreign matter is prevented from going out from the opening 39a.

Furthermore, a position of the groove 39b is preferably, but not limited to, directly below the coil 36 and the permanent magnet 37, as in the lens unit 3. That is, it is preferable that the groove 39b is formed directly below a space formed in the direction of the optical axis between the flange section of the lens holder 33 and the coil 36, and the permanent magnet 37. Such an arrangement of the groove 39b makes it possible to catch the foreign matter that falls on the base 39 via the space, right after the foreign matter falls.

Further, it is preferable that an adhesive material is applied to the surface (the surface facing the bottom surface of the lens holder 33) of the base 39, as the dust trap material 40. It is particularly preferable that the dust trap material 40 is applied to a surface of the groove 39b, as in the lens unit 3. This makes it possible to catch, by use of the dust trap material 40, the foreign matter that has moved onto the base 39. Accordingly, it becomes possible to successfully prevent the foreign matter from going out from the opening 39a on the side from which light exits. Furthermore, if the dust trap material 40 is applied to the groove 39b, it is possible to retain the foreign matter in the groove 39b. That is, it becomes possible to retain, in the groove 39b, the foreign matter that falls on the base 39 via the space, right after the foreign matter falls.

In other words, in the lens unit 3, the dust trap material 40 is applied to the base 39 in the vicinity directly below the coil 36 and the permanent magnet 37. For this reason, in a case where the foreign matter that has moved via the space between the coil 36 and the permanent magnet 37 falls straight, the foreign matter will fall upon the dust trap material 40. This allows the dust trap material 40 to catch the foreign matter.

The dust trap material 40 can catch the foreign matter as long as the dust trap material 40 is applied to the path via which the foreign matter moves. Further, in the lens unit 3, the dust trap material 40 is applied right in front of the projection 33a blocking the path via which the foreign matter moves. This makes it possible to catch, by use of the dust trap material 40, almost all of the foreign matters that have been trapped there.

The dust trap material 40 is not particularly limited as long as it contains an adhesive material. The dust trap material 40 may be semisolid (or almost solid) fat and oil or semisolid (or almost solid) resin. For example, grease is particularly preferable as the dust trap material 40. The grease is a sort of semisolid fat and oil, or almost liquid fat and oil. The grease may be made from, for example, a semisolid (or almost solid) lubricant agent or a paste lubricant agent. The grease may be a molybdenum disulfide lubricant agent, a white color lubricant agent, a silicone lubricant agent, or a perfluoropolyether lubricant agent, for example. Further, the grease may be a mineral lubricating grease mainly made from a liquid petroleum, a poly-α-olefin grease mainly made from a poly-α-olefin oil, a silicone grease mainly made from a silicone oil, a fluorosilicone grease mainly made from a silicone oil, or a perfluoropolyether grease mainly made from a perfluoropolyether, for example. These greases may be used solely, or two or more sorts of these greases may be mixed with each other and used. Furthermore, the grease may be a material containing an additive for grease, such as a lithium soap, a calcium soap, and a polytetrafluoroethylene (PTFE).

In the lens unit 3, the lens holder 33 was provided with the projection 33a. However, the projection 33a may be provided to the base 39. Further, it is possible to have another arrangement in which the path via which the foreign matter moves toward the opening 39a is blocked regardless whether the lens function is in the ON state or the OFF state (regardless whether or not the drive section is activated).

As described above, the camera module of the present invention has an arrangement in which (i) the mechanical shutter and the lens drive device are stacked with each other, and (ii) the image capturing lens or the lens barrel is partially arranged in the depression section provided in the central part of the mechanical shutter. Therefore, the thickness of the camera module is reduced. Further, in order that the lens barrel does not directly get an impact when the lens drive device drives the image capturing lens, the space between the lens barrel, and the mechanical shutter or the magnetic shield plate is suitably set.

Accordingly, in a case where a camera module employs both the mechanical shutter and the autofocus function, the present invention can solve the conventional problem that the camera module becomes larger, or the camera module becomes thicker.

The present invention can be described in the following forms.

[1] A camera module including: a lens drive device having an image capturing lens and driving the image capturing lens to move in a direction of an optical axis; a mechanical shutter for controlling an ON/OFF state with respect to light entering into the image capturing lens; and an image capturing element for converting the light that has entered via the image capturing lens into an electrical signal, wherein: the image capturing element, the lens drive device, and the mechanical shutter are stacked with each other in a direction of the optical axis, and a part of the image capturing lens is arranged in a depression section formed approximately in a central part of the mechanical shutter.

[2] The camera module according to [1], wherein: the image capturing lens and the mechanical shutter are set to have a space therebetween so as not to collide with each other within a stroke moving range of the image capturing lens of the lens drive device.

[3] The camera module according to [1] or [2], wherein: a magnetic shield plate is provided between the mechanical shutter and the lens drive device.

[4] The camera module according to [3], wherein: the image capturing lens and the magnetic shield plate are set to have a space so as not to collide with each other within the stroke moving range of the image capturing lens of the lens drive device.

[5] The camera module according to [3] or [4], wherein: an opening for transmitting light is formed approximately in a central part of the magnetic shield plate, and a diameter of the opening is approximately the same as a diameter of the depression section of the mechanical shutter.

As described above, the camera module of the present invention has an arrangement in which the shutter section (mechanical shutter) is provided above the top surface of the lens drive section, and the depression section in which the protrusion section of the image capturing lens is held is formed on the back surface of the shutter section. Therefore, the present invention realizes an effect of allowing a camera module including the mechanical shutter and the lens drive section to be smaller and thinner at the same time.

In the camera module of the present invention, the lens drive section preferably drives the image capturing lens so that the image capturing lens and the shutter section do not touch each other within an entire moving range of the image capturing lens.

According to the invention, the image capturing lens and the shutter section do not touch each other throughout the entire moving range of the image capturing lens. That is, there is always a space provided between the image capturing lens and the shutter section. This prevents the image capturing lens from touching the shutter section. Accordingly, it is possible to prevent the image capturing lens from being at a wrong position (a failure in focus adjustment).

In the camera module of the present invention, (i) the lens drive section preferably drives the image capturing lens in a direction of an optical axis by use of electromagnetic force, (ii) the shutter section preferably opens or blocks a light path by use of electromagnetic force, and a magnetic shield plate is preferably provided between the lens drive section and the shutter section.

According to the invention, both the lens drive section and the shutter section are driven by use of the electromagnetic force. For this reason, for example, there is a risk that the shutter section has a malfunction due to a leakage of a magnetic field generated in driving the lens drive section.

According to the invention, the magnetic shield plate is provided between the lens drive section and the shutter section. Therefore, the magnetic shield plate reduces a leakage of the magnetic field from the lens drive section toward the shutter section, or a leakage of the magnetic field from the shutter section toward the lens drive section. Accordingly, it is possible to prevent the shutter section and the lens drive section from having a malfunction due to the leakage of the magnetic field.

In the camera module of the present invention, the lens drive section preferably drives the image capturing lens so that the image capturing lens and the magnetic shield plate do not touch each other throughout an entire driving range of the image capturing lens.

According to the invention, the image capturing lens and the magnetic shield plate do not touch each other throughout the entire driving range of the image capturing lens. In other words, there is always a space provided between the image capturing lens and the magnetic shield plate. This prevents the image capturing lens from touching the magnetic shield plate. Accordingly, it is possible to prevent the image capturing lens from being at a wrong position (the failure in the focus adjustment).

In the camera module of the present invention, the magnetic shield plate preferably has an opening through which the light path passes, and a diameter of the opening of the magnetic shield plate is preferably shorter than a diameter of an opening that is formed to the lens drive section to hold the image capturing lens, and is longer than a diameter of the protrusion section of the image capturing lens.

According to the invention, the diameter of the opening of the magnetic shield plate is shorter than the diameter of the opening of the lens drive section to hold the image capturing lens, and is longer than the diameter of the protrusion section of the image capturing lens. This makes it possible to cause an area of the magnetic shield plate to be larger. Accordingly, it is possible to improve a magnetic shield effect generated by the magnetic shield plate.

The present invention is suitably used as a camera module included in a mobile terminal, such as a communication device, and allows the camera module to be smaller and thinner at the same time.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. A camera module comprising:
   a lens drive section, including an image capturing lens, for driving the image capturing lens in a direction of an optical axis;
   a shutter section for controlling an amount of light that enters into the image capturing lens by opening or blocking a light path; and
   an image capturing element for converting an optical signal received via the image capturing lens into an electrical signal,
   the image capturing lens having, at its end, a protrusion section that protrudes from a top surface of the lens drive section,
   the shutter section being provided above the top surface of the lens drive section, and
   the shutter section having, on its back surface side, a depression section in which the protrusion section of the image capturing lens is held.

2. The camera module according to claim 1, wherein:
   the lens drive section drives the image capturing lens so that the image capturing lens and the shutter section do not touch each other throughout an entire moving range of the image capturing lens.

3. The camera module according to claim 1, wherein:
   the shutter section including a shutter blade and a driving mechanism for driving the shutter blade; and
   the shutter blade and the driving mechanism are provided above the top surface of the lens drive section.

4. The camera module according to claim 1, wherein:
   (i) the lens drive section drives the image capturing lens in the direction of the optical axis by use of electromagnetic force,
   (ii) the shutter section opens or blocks the light path by use of electromagnetic force, and
   (iii) a magnetic shield plate is provided between the lens drive section and the shutter section.

5. The camera module according to claim 4, wherein:
   the lens drive section drives the image capturing lens so that the image capturing lens and the magnetic shield plate do not touch each other throughout an entire driving range of the image capturing lens.

6. The camera module according to claim 4, wherein:
   the magnetic shield plate has an opening through which the light path passes, and
   a diameter of the opening of the magnetic shield plate is shorter than a diameter of an opening that is formed to the lens drive section to hold the image capturing lens, and is longer than a diameter of the protrusion section of the image capturing lens.

7. The camera module according to claim 4, wherein:
   the magnetic shield plate is attached to an entire back surface of the shutter section.

8. A camera module comprising:

a lens drive section, including an image capturing lens, for driving the image capturing lens in a direction of an optical axis;

a shutter section for controlling an amount of light that enters into the image capturing lens by opening or blocking a light path; and an image capturing element for converting an optical signal received via the image capturing lens into an electrical signal, the image capturing lens having, at its end, a protrusion section that protrudes from a top surface of the lens drive section, the shutter section being provided above the top surface of the lens drive section, the shutter section having, on its back surface side, a depression section in which the protrusion section of the image capturing lens is held, the lens drive section including
  a lens holder for holding the image capturing lens, and a base provided on a bottom section of the lens drive section, the base having an opening through which the light path passes, and the lens holder having a bottom surface, on which a projection is formed so as to surround an entire circumference of the opening of the base.

9. The camera module according to claim 8, wherein:
a surface of the base has a concavity and convexity shape, the surface facing the bottom surface of the lens holder.

10. The camera module according to claim 8, wherein:
an adhesive material is applied to the surface of the base, the surface facing the bottom surface of the lens holder.

11. The camera module according to claim 8, wherein:
the projection is in contact with the base in a stationary state where the lens drive section does not drive the image capturing lens.

12. The camera module according to claim 11, wherein:
the lens drive section includes a pressing section for pressing, in the stationary state, the lens holder toward a side from which light exits.

13. An electronic device comprising a camera module, the camera module comprising:

a lens drive section, including an image capturing lens, for driving the image capturing lens in a direction of an optical axis;

a shutter section for controlling an amount of light that enters into the image capturing lens by opening or blocking a light path; and an image capturing element for converting an optical signal received via the image capturing lens into an electrical signal, the image capturing lens having, at its end, a protrusion section that protrudes from a top surface of the lens drive section, the shutter section being provided above the top surface of the lens drive section, and the shutter section having, on its back surface side, a depression section in which the protrusion section of the image capturing lens is held.

14. An electronic device comprising a camera module, the camera module comprising:

a lens drive section, including an image capturing lens, for driving the image capturing lens in a direction of an optical axis;

a shutter section for controlling an amount of light that enters into the image capturing lens by opening or blocking a light path; and an image capturing element for converting an optical signal received via the image capturing lens into an electrical signal, the image capturing lens having, at its end, a protrusion section that protrudes from a top surface of the lens drive section, the shutter section having, on its back surface side, a depression section in which the protrusion section of the image capturing lens is held, the lens driving section including a lens holder for holding the image capturing lens, and a base provided on a bottom section of the lens drive section, the base having an opening through which the light path passes, and the lens holder having a bottom surface, on which a projection is formed so as to surround the entire circumference of the opening of the base.

* * * * *